US010827793B2

(12) United States Patent
Lee

(10) Patent No.: US 10,827,793 B2
(45) Date of Patent: Nov. 10, 2020

(54) HEADWEAR WITH MOVABLE BRIM

(71) Applicant: Anna Lee, South Pasadena, CA (US)

(72) Inventor: Anna Lee, South Pasadena, CA (US)

(*) Notice: Subject to any disclaimer, the term of this patent is extended or adjusted under 35 U.S.C. 154(b) by 344 days.

(21) Appl. No.: 15/818,197

(22) Filed: Nov. 20, 2017

(65) Prior Publication Data
US 2018/0317585 A1 Nov. 8, 2018

Related U.S. Application Data

(60) Provisional application No. 62/500,234, filed on May 2, 2017.

(51) Int. Cl.
A42B 1/06 (2006.01)
A41G 7/00 (2006.01)
G02C 3/02 (2006.01)
A41D 20/00 (2006.01)
A42B 1/00 (2006.01)

(52) U.S. Cl.
CPC ............ *A42B 1/064* (2013.01); *A41D 20/00* (2013.01); *A41G 7/00* (2013.01); *A42B 1/006* (2013.01); *G02C 3/02* (2013.01)

(58) Field of Classification Search
CPC ........ A42B 1/064; A42B 1/006; A41D 20/00; A41G 7/00
See application file for complete search history.

(56) References Cited

U.S. PATENT DOCUMENTS

| | | | | |
|---|---|---|---|---|
| 901,320 A | * | 10/1908 | Bruzaud | A42B 1/247 2/10 |
| 1,097,530 A | * | 5/1914 | Cabelinsky | 2/84 |
| 2,425,847 A | * | 8/1947 | Vaca | A42B 1/247 2/10 |
| 2,462,258 A | * | 2/1949 | Dannenberg | A42B 1/062 2/195.5 |
| 2,467,448 A | * | 4/1949 | Vaca | A42B 1/247 2/10 |
| 2,481,960 A | * | 9/1949 | Wall | A42B 1/062 2/10 |
| 2,500,280 A | * | 3/1950 | Feldman | A42B 1/247 2/10 |
| 2,533,626 A | * | 12/1950 | Reiter | A42B 1/062 16/257 |
| 2,538,608 A | * | 1/1951 | Vaca | A42B 1/247 2/10 |
| 2,560,669 A | * | 7/1951 | Vaca | A42B 1/247 2/10 |

(Continued)

OTHER PUBLICATIONS

USPTO, International Search Report and Written Opinion issued in related International Patent Application No. PCT/US2017/63780 dated Feb. 6, 2018, 14 pages.

(Continued)

Primary Examiner — Richale L Quinn
(74) Attorney, Agent, or Firm — Cislo & Thomas, LLP

(57) ABSTRACT

Headwear having a band portion for securing the headwear to a user's head, the band portion having a front section and a rear section, a base attached to and extending away from the front section of the band portion, and a brim movably coupled to the base, the brim moveable from a first position in which the brim functions as a sun shade, to a second position in which the brim is a face mask and/or glasses.

19 Claims, 6 Drawing Sheets

(56) References Cited

U.S. PATENT DOCUMENTS

| | | | | |
|---|---|---|---|---|
| 2,648,091 A * | 8/1953 | Jones | A42B 1/247 | 16/336 |
| 2,648,847 A * | 8/1953 | Crowder | A42B 1/062 | 2/195.5 |
| 2,677,853 A * | 5/1954 | Ross | A42B 1/062 | 16/235 |
| 4,580,829 A | 4/1986 | Matheopoulos | | |
| 5,669,071 A * | 9/1997 | Vu | A42B 1/247 | 2/10 |
| 5,689,827 A * | 11/1997 | Ryder | A42B 1/247 | 2/10 |
| 5,930,834 A * | 8/1999 | Toovey | A42B 1/247 | 2/10 |
| 6,088,837 A * | 7/2000 | Baker | A61F 9/045 | 2/10 |
| 6,237,156 B1 * | 5/2001 | Ellman | A42B 1/064 | 2/10 |
| 6,557,180 B2 * | 5/2003 | Hall Mckenzie | A42B 1/064 | 2/195.1 |
| 6,604,975 B1 | 8/2003 | Yeh | | |
| 7,082,618 B1 * | 8/2006 | Muso | A42B 1/062 | 2/175.1 |
| 7,185,371 B2 * | 3/2007 | Koo | A42B 1/062 | 2/10 |
| 8,434,162 B2 * | 5/2013 | Stachler | A42B 3/22 | 2/10 |
| 8,516,618 B2 * | 8/2013 | Adams | A42B 1/064 | 2/175.1 |
| 8,621,663 B2 * | 1/2014 | Stachler | A42B 3/185 | 2/10 |
| 8,631,512 B2 * | 1/2014 | Stachler | A42B 3/185 | 2/10 |
| 8,640,264 B2 * | 2/2014 | Ramer | A42B 1/062 | 2/171.3 |
| 9,003,570 B2 * | 4/2015 | Kay | A42B 1/248 | 2/195.1 |
| 2005/0132461 A1 * | 6/2005 | Koo | A42B 1/247 | 2/12 |
| 2007/0261155 A1 * | 11/2007 | Tabacchi | A61F 9/025 | 2/439 |
| 2009/0094720 A1 * | 4/2009 | Stachler | A42B 3/185 | 2/5 |
| 2009/0307817 A1 * | 12/2009 | Stachler | A42B 3/185 | 2/10 |
| 2010/0319701 A1 | 12/2010 | Connell | | |
| 2013/0125292 A1 * | 5/2013 | Weaver | A42B 1/006 | 2/209.13 |

OTHER PUBLICATIONS http://www.rallyflipcap.com/; (webpage)—extracted on Oct. 16, 2017.

* cited by examiner

HEADWEAR WITH MOVABLE BRIM

CROSS-REFERENCE TO RELATED APPLICATION

This patent application claims the benefit of U.S. Provisional Patent Application Ser. No. 62/500,234 entitled "A hat with a bill that flips down into a mask and/or sunglasses." filed May 2, 2017, which application is incorporated in its entirety herein by this reference.

TECHNICAL FIELD

This invention relates to headwear having a movable bill or brim, in which the movable bill or brim is configured to rest in at least three positions—a horizontally disposed position generally observed with most headwear, an upwardly and vertically disposed position, and a downwardly and vertically disposed position wherein the bill or brim may serve as a mask and/or sunglasses.

BACKGROUND

Many children and adults are enamored with certain comic book characters, movie characters, animals, and the like, and as such, they enjoy dressing up as their beloved character. Often times, this dress up is associated with visiting theme parks or other outdoor activities. Being outside requires protection from the sun, and thus there is usually a need for the person dressing up to wear a hat, and optionally sunglasses. Typically, the dress up involves wearing a face mask resembling the character, but wearing a face mask, sunglasses and a hat at the same time can be difficult, cumbersome, and even lead to overheating to say the least. Additionally, when the user tires of wearing the face mask, he or she must then carry it around until he or she can find a place to safely stow it.

Accordingly, there is a need for headwear with a moveable brim that is capable of functioning both as a sun shade and as a face mask, and optionally sunglasses, when desired.

SUMMARY

In one embodiment, the invention described herein is directed to headwear comprising: a) a band portion for securing the headwear to a user's head, the hand portion having a front section and a rear section; b) a base attached to and extending way from the front section of the band portion; and c) a brim having a proximal portion and a distal portion, the proximal portion of the brim movably coupled to the base, the brim moveable from a first position in which the brim functions as a sun visor, to a second position in which the brim comprises a face mask, the distal portion of the brim comprising a concave section disposed approximately halfway along a width of the brim, such that when the brim is in the second position, the concave section is disposed at least partially about the user's nose, the brim having at least one eye opening disposed therein, the at least one eye opening being located at approximately eye level to the user when the brim is in the second position; wherein the proximal portion of the brim is moveably coupled to the base by at least one hinge comprising: i) a male portion coupled to the base; ii) a female portion coupled to the proximal portion of the brim, the female portion having a spring disposed therein; and iii) a pin that extends through both the male and female portions; wherein when the male portion is mated with the female portion, the spring applies force against the male portion, providing resistance against moving the brim from the first position to the second position, and resistance against moving the brim from the second position to the first position.

The headwear is a hat or a visor and the at least one eye opening can comprise a glasses lens (e.g., for eyeglasses or sunglasses).

Optionally, the brim is coupled to the base by at least one hinge, the hinge comprising a resistance mechanism such that the brim remains in either the first or second position until the user applies force to move the brim to the other position.

Optionally, the least one hinge comprises: a) a male portion coupled to the brim; b) a female portion coupled to the base, the female portion having a spring disposed therein; and c) a pin that extends through both the male and female portions, and when the male portion is mated with the female portion, the spring applies pressure against the male portion, providing resistance against moving the brim from the first position to the second position, and against moving the brim from the second position to the first position.

In a second embodiment, the present invention is directed to headwear comprising a) a band portion for securing to a user's head, the band portion having a front section and a rear section; and b) a brim movably coupled to the front section of the band portion, the brim moveable from a first position in which the brim functions as a sun visor, to a second position in which the brim comprises a face mask.

The brim comprises at least one eye opening disposed therein, the at least one eye opening being approximately eye level to a user when the brim is in the second position. The at least one eye opening can comprise a glasses lens such as for prescription glasses and/or sunglasses. The actual lens need not be actual glass, but, without limitation, material that is typically used for prescription glass or sunglass lenses.

A distal portion of the brim comprises a concave section disposed approximately halfway along a width of the brim, such that when the brim is in the second position, the concave section is disposed at least partially about the user's nose.

The brim is coupled to the band portion by at least one hinge, the hinge having a resistance mechanism incorporated therein such that the brim remains in either the first or second position until a user applies pressure to move the brim to the other position.

The brim is coupled to the front section of the band portion by at least one hinge comprising: a) male portion coupled to the front section of the band portion; b) a female portion coupled to the brim, the female portion having a spring disposed therein; and c) a pin that extends through both the male and female portions, and when the male portion is mated with the female portion, the spring applies pressure against the male portion, providing resistance against moving the brim from the first position to the second position, and against moving the brim from the second position to the first position. Optionally, the male portion of the hinge is coupled to the brim and the female portion is coupled to the front section of the band portion.

DETAILED DESCRIPTION OF THE INVENTION

The detailed description set forth below in connection with the appended drawings is intended as a description of presently-preferred embodiments of the invention and is not intended to represent the only forms in which the present invention may be constricted or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
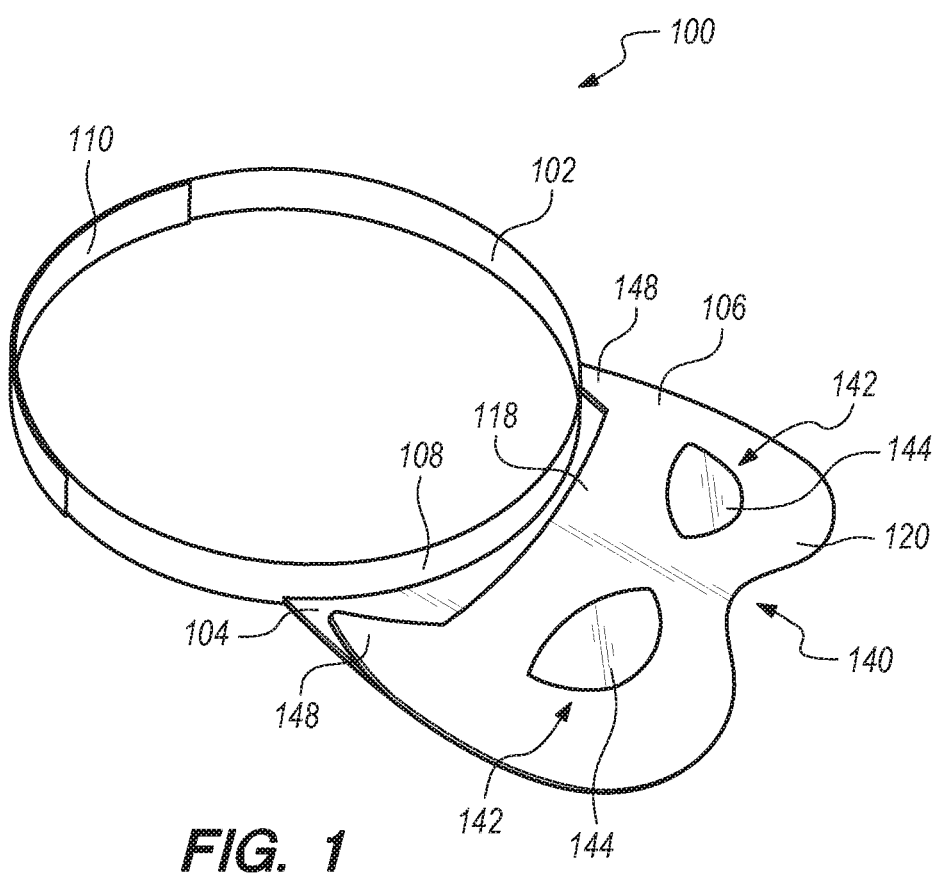
FIG. 1 a perspective view of headwear having features of the present invention, wherein the headwear is a visor.
Figure 2:
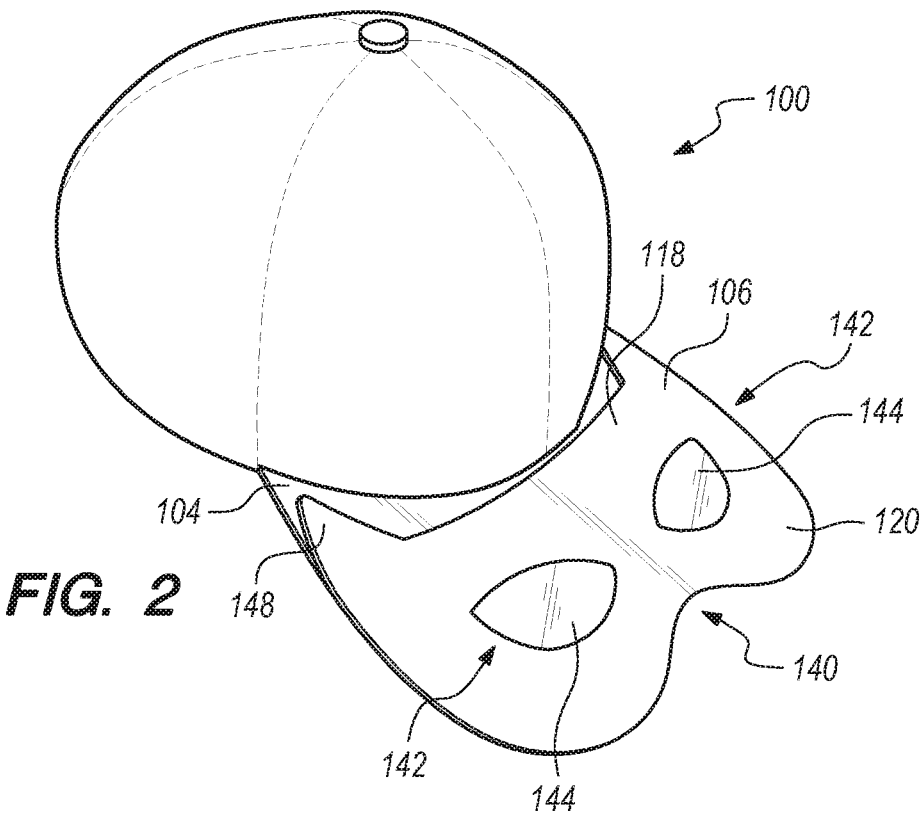
FIG. 2 is a perspective view of headwear having features of the present invention, wherein the headwear is a hat and the brim is in the first position.
Figure 3:
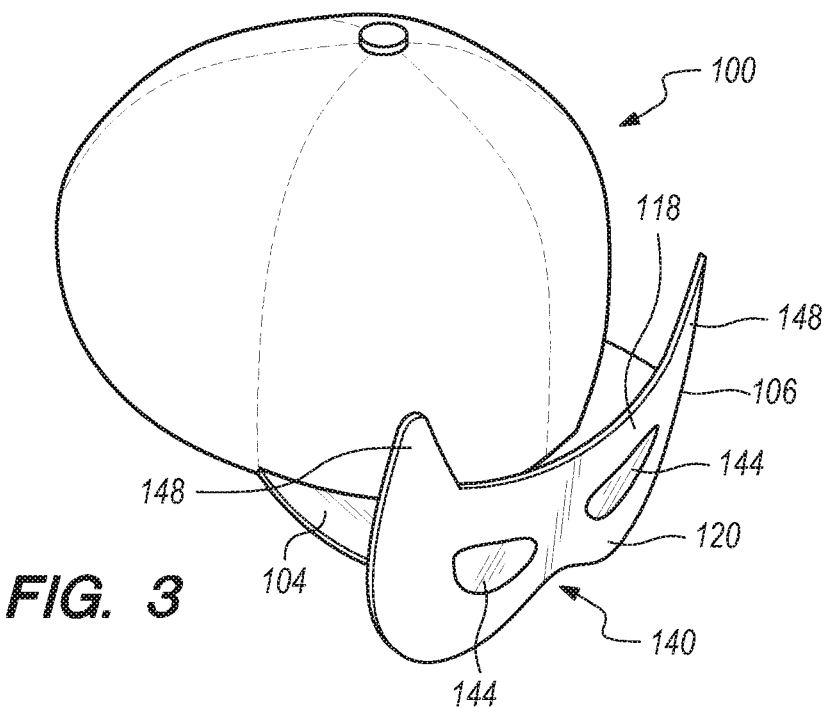
FIG. 3 is a perspective view of the headwear of FIG. 2, wherein the brim is moved to the second position.
Figure 7:
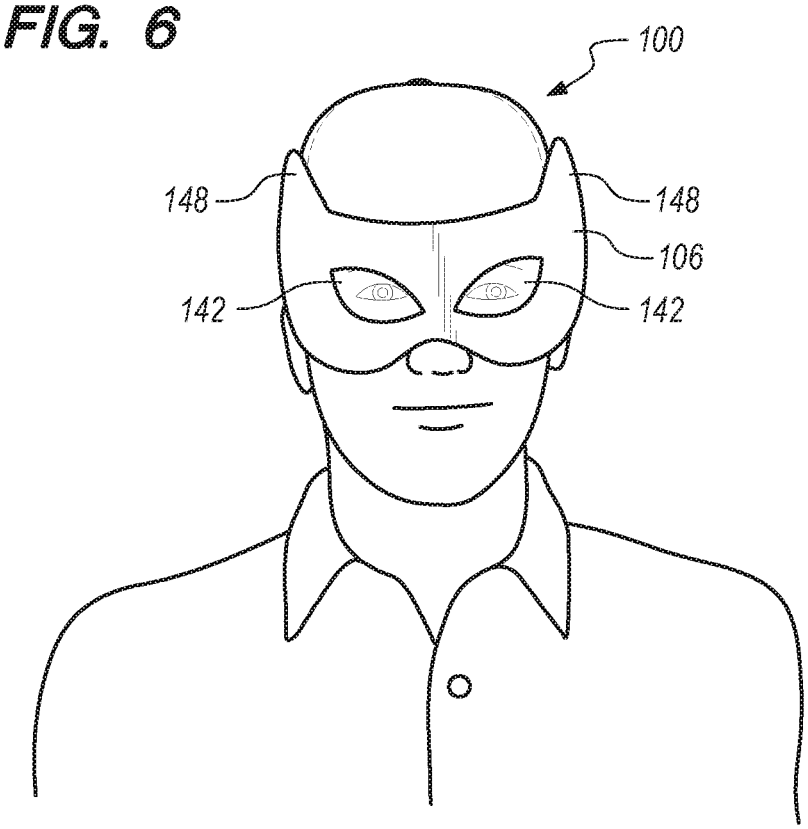
FIG. 7 is a front view of a user wearing the headwear of FIG. 3.
Figure 8:
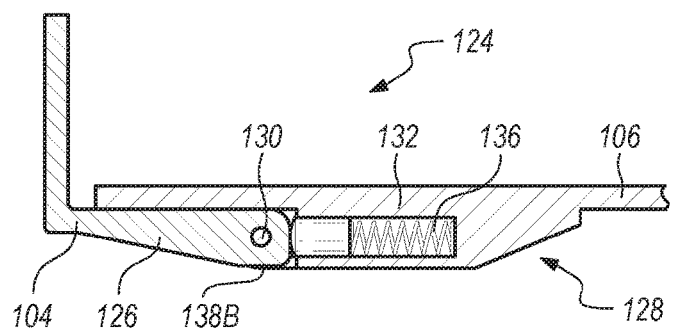
FIG. 8 is a sectional view of a hinge taken along line 8-8 of FIG. 4, wherein the brim is in the first position.
Figure 9:
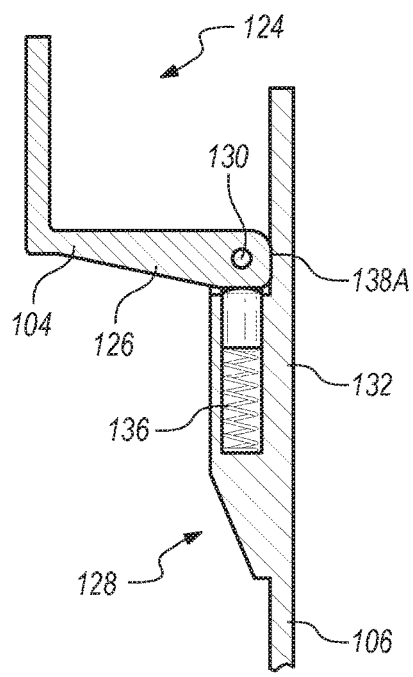
FIG. 9 is a sectional view of the hinge of FIG. 8, wherein the brim is in the second position.

Referring now to FIG. 1, there is shown headwear 100 comprising a band portion 102 for securing the headwear to a user's head, a base 104 attached to and extending away from the band portion 102, and a brim 106 movably coupled to the base 104. As shown in FIGS. 2, 3, and 7, the brim 106 is moveable from a first position in which the brim functions as a sun shade, to a second position in which the brim 106 comprises a face mask. The headwear 100 can be a visor (i.e., with an opening about the crown of a user's head), as shown in FIG. 1, or a hat as shown (i.e., with a closure about the crown of a user's head) in FIGS. 2-7.

The band portion 102 has a front section 108 and a rear section 110. When the headwear 100 is worn in a typical fashion, the front section 108 of the band portion 102 is located above the user's face, and the rear section 110 is located at the back of the user's head. However, headwear 100 can be worn backwards or off-center, resulting in the location of the front and rear sections 108, 110 being reversed or otherwise adjusted, and as such, the terms "front and rear section" are not location limiting.

Figure 4:
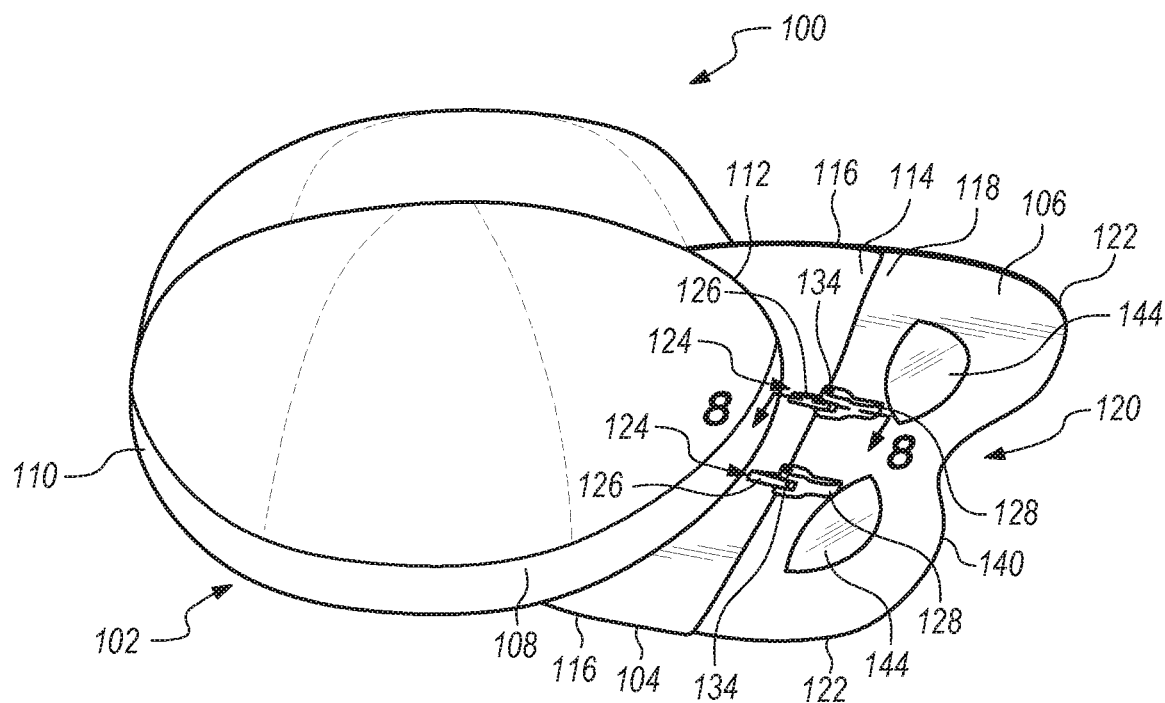
FIG. 4 is a bottom view of the headwear of FIG. 2.
Figure 5:
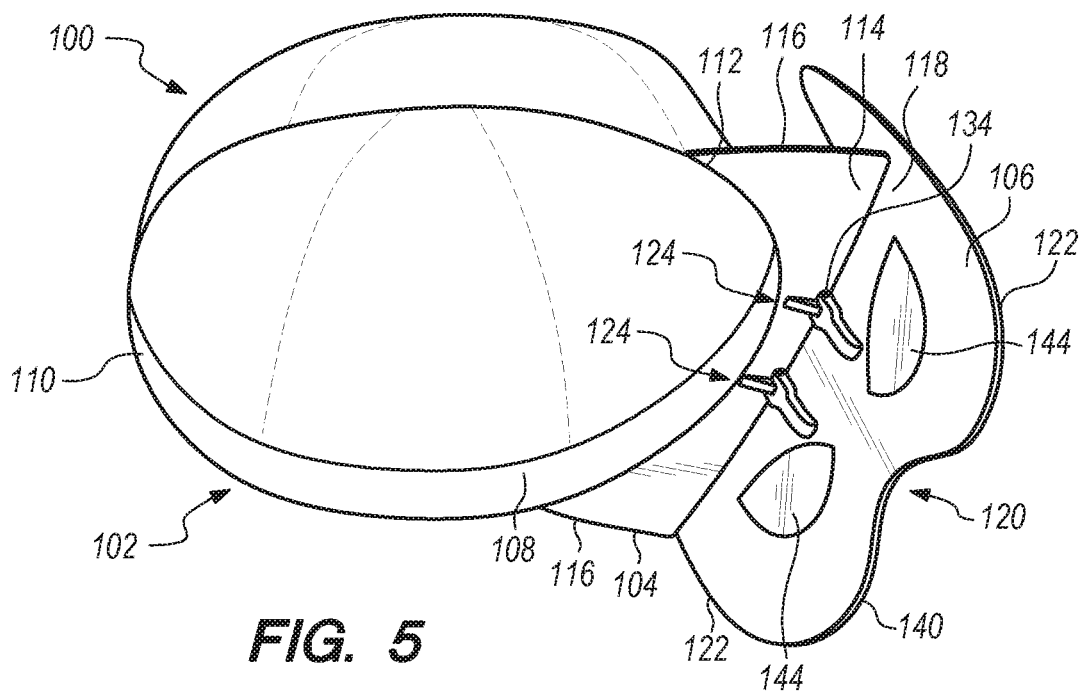
FIG. 5 is a bottom view of the headwear of FIG. 3.
Figure 6:
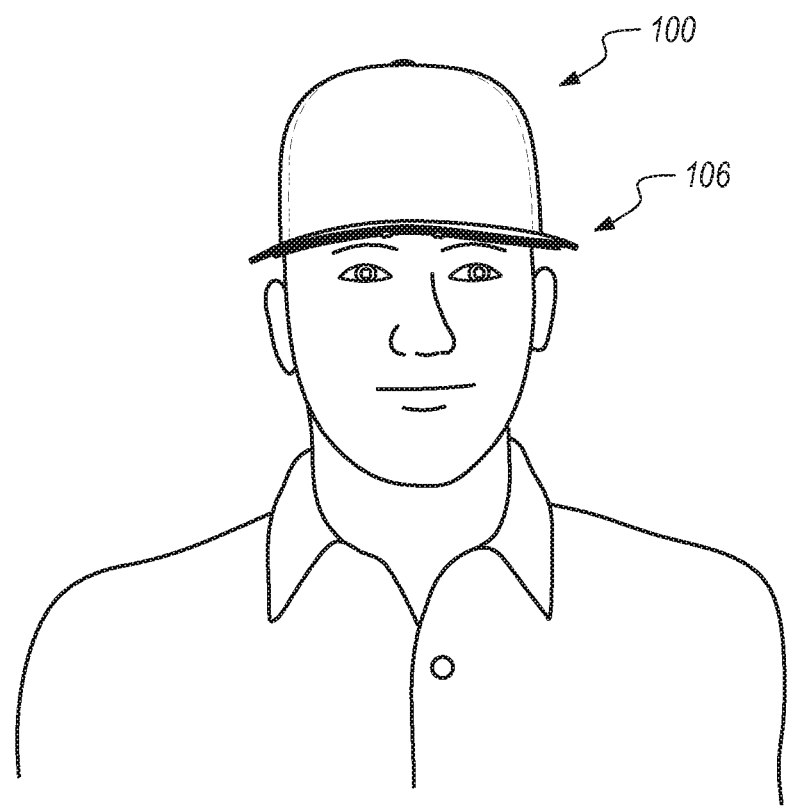
FIG. 6 is a front view of a user wearing the headwear of FIG. 2.

Referring now to FIGS. 4 and 5, the base 104 is attached to and extends away from the front section 108 of the band portion 102, in normal headwear brim fashion. The base 104 has a proximal portion 112 coupled to the band 102, a distal portion 114 distal relative to the band 102 and two side edges 116 extending between and joining the proximal 112 and distal 114 portions. The base 102 can be generally flat and substantially planar along its width, or slightly convexly arched, in the fashion of typical baseball or golf hat brims.

Figure 11:
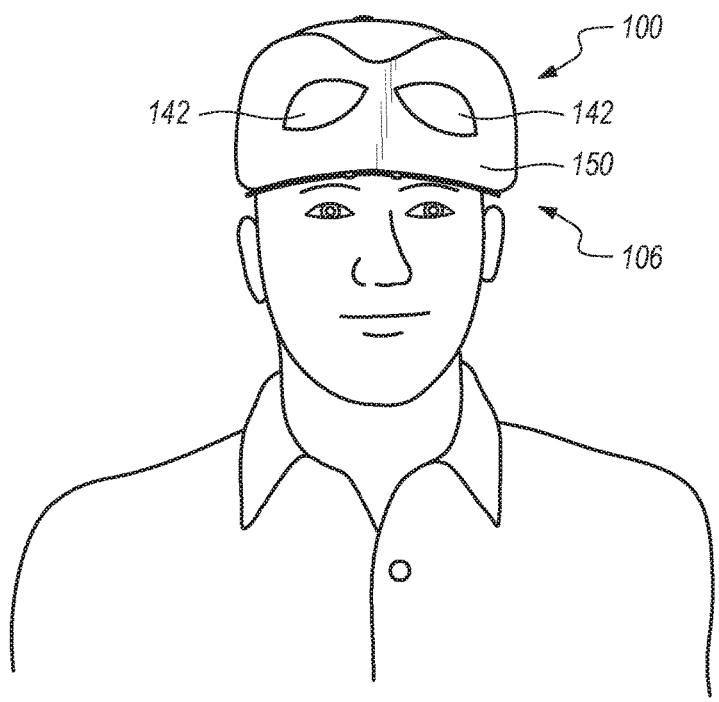
FIG. 11 is a front view of a user wearing the headwear of FIG. 3, wherein the brim is moved to the third position.
Figure 12:
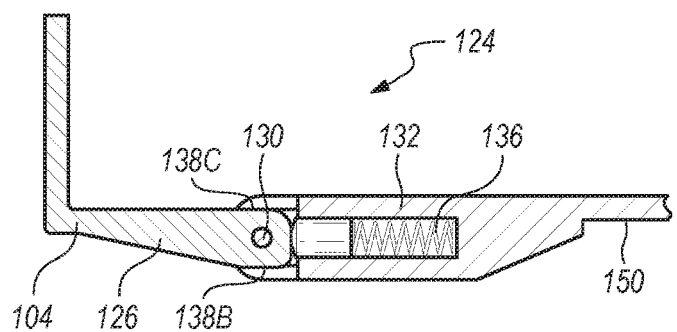
FIG. 12 is a sectional view of a hinge taken along line 8-8 of FIG. 4, wherein the brim is in the first position.
Figure 13:
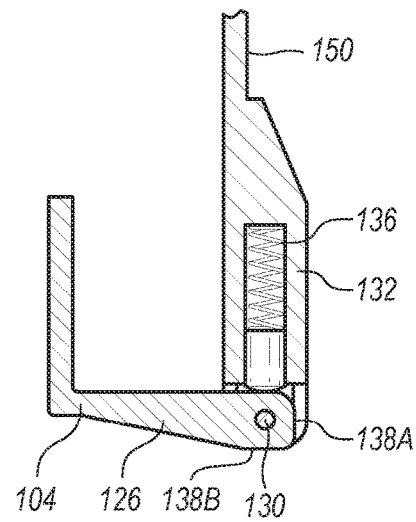
FIG. 13 is a sectional view of the hinge of FIG. 8, wherein the brim is in the third position.

The brim 106 has a proximal portion 118, a distal portion 120, and two side edges 122 extending between and joining the proximal 118 and distal 120 portions. The proximal portion 118 is proximate the band portion 102 and the distal portion 120 is distal relative to the band portion 102. The proximal portion 118 of the brim 106 is movably coupled to the base 104, and the brim 106 is moveable from a first position in which the brim 106 functions as a sun shade, as shown in FIGS. 1, 2, 4 and 6, to a second position in which the brim 106 comprises a face mask, as shown in FIGS. 3, 5, and 7. Typically, when the brim 106 is in the first position the brim 106 is substantially horizontal, and when the brim 106 is in the second position, the brim 106 is substantially vertical and oriented at a downward angle relative to base 104. However, the orientation of the brim 106 in the first and the second positions is not limited to strictly horizontal and strictly vertical, and could be oriented at any angle with respect to the band portion 102 or base 104. Additionally, the brim 106 can have more positions than the first and second positions, and could optionally comprise three or more positions. As shown in FIGS. 11 and 13, the brim 106 can have a third position, wherein the brim 106 is moved vertically upward, opposite the second position, such that a bottom surface 150 of the brim 106 is exposed for view. The bottom surface 150 of the brim 106 can have a design, pattern, or advertisement thereon, such that it is displayed for view to the public.

The brim 106 can be generally flat and substantially planar along its width, or slightly convexly arched, in the fashion of typical baseball or golf hat brims. The two side edges 122 of the brim 106 can be aligned and flush with the two side edges 116 of the base 104, but it is not required that they be so oriented.

The proximal portion 118 of the brim 106 is moveably coupled to the base 104 by at least one hinge 124, the hinge comprising a male portion 126, a female portion 128, and a pin 130 that extends through both the al and female: portions 126, 128. The pin 130 is the pivot point, and the male and female portions 126, 128 pivot with respect to each other about the pin 130. Both the male and female portions 126, 128 can be coupled to either the base 104 or the proximal portion 118 of the brim 106 via being integrally formed therein, mounted thereon, or otherwise affixed thereto.

In the embodiment shown in FIGS. 4 and 5, the male portion 126 is coupled to the base 104 and the female portion 128 is coupled to the proximal portion 118 of the brim 106. As shown in FIGS. 8, 9, 12 and 13, the female portion 128 has a body 132 and two extensions 134 between which an end of the male portion 126 is disposed. The extensions 134 are shown in FIGS. 4 and 5. A spring 136 is disposed within the body 132 of the female portion 128. The end of the male portion 126 that mates with the female portion 128 (disposed between the two extensions 134 of the female portion 128) has two or more planar surfaces 138A,B,C disposed at approximately a right angles to each other. When the male portion 126 is mated with the female portion 128, and the brim 106 is in the first position, the spring 136 applies force against a first planar surface 138A of the male portion 126. When the brim 106 is in the second position, the spring 136 applies force against a second planar surface 138B of the male portion 126. This force provides resistance against moving the brim 106 from the first position to the second position, and resistance against moving the brim 106 from the second position to the first position. When the brim 106 is in the third position, the spring 136 applies force against a third planar surface 138C of the male portion 126.

Optionally, the male portion 126 is coupled to the brim 106 and the female portion 128 is coupled to the base 104.

Optionally, the brim 106 is coupled to the base 104 by at least one hinge 124, the hinge 124 comprising a resistance mechanism such that the brim 106 remains in either the first or second position until the user applies force to move the brim 106 to the other position. Several non-limiting examples of such a resistance mechanism suitable for use in the present invention include a cam, piston, spring-biasing, or other mechanism that remains in a given position until it is moved past a certain point, and then it moves easily to the other position. Optionally, the hinge 124 can be a friction-based rotational joint. Optionally, the resistance mechanism can be one or more soft or hard, bendable or hinge-like apparatuses that hold the brim 106 in two or more locked positions.

Additionally, the distal portion 120 of the brim 106 can comprise a concave section 140 disposed approximately halfway along the width of the brim 106, such that when the brim 106 is in the second position, as shown in FIG. 7, the concave section 140 is disposed at least partially about the user's nose.

Additionally, the brim 106 can have at least one eye opening 142 disposed therein, the at least one eye opening 142 being located at approximately eye level to the user when the brim 106 is in the second position, as shown in FIG. 7. Preferably there are two eye openings 142. Optionally the at least one eye opening 142 comprises a glasses lens 144. The glasses lens 144 can be clear or tinted, so that it functions as sunglasses for the user. The actual lenses need not be glass, but, without limitation, material that is typically used for prescription glass or sunglass lenses.

Figure 10:
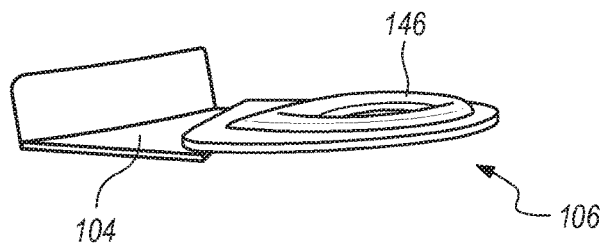
FIG. 10 is a side view of the brim of FIGS. 1 and 2, wherein a raised border is disposed around the eye openings.

Referring now to FIG. 10, the brim 106 can also have a raised border 146 around the at least one eye opening 142 providing an additional design feature to the brim 106. The at least one eye opening 142 can be any shape desired by the manufacturer so that it resembles the eyes of whatever action figure or character is shown on the brim 106. For example, in the event the character is a cat, the eye opening 142 can be almond shaped. In the event the character is a mouse, the eye opening 142 can be circular or oval shaped. These examples are not limiting. Optionally, the entire brim 106, or at least a substantial portion of it, can be made from a translucent, clear, or tinted plastic material, such that no designated eye openings 142 are needed because the user can see through the brim 106 itself.

The brim 106 can also have ear-shaped projections 148 extending from each corner of the proximal portion 118 of the brim 106, so that when the brim 106 is moved to the second position, the face mask also includes ears for whatever character is shown. The ear-shaped projections 148 can be in any shape, such as cat ears, dog ears, bunny ears, or horns, but this list of examples is not limiting.

Optionally, the brim 106 is movably coupled directly to the front section 108 of the band portion 102.

Optionally, as noted above, the hinges 124 may be constructed and affixed to the base 104 and/or the brim 106 in such a way as to permit the brim 106 to be moved to the third position oriented vertically such that the underside of the brim 106 (in the context of standard hat usage) would be facing away from the user's head and viewable by others positioned in front of the user. In this embodiment, designs, advertising, or the like may be applied to the underside of the brim.

The foregoing description of the preferred embodiment(s) of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. Headwear comprising:
a) a band portion for securing the headwear to a user's head, the band portion having a front section and a rear section;
b) a base attached to and extending way from the front section of the band portion; and
c) a brim having a proximal portion and a distal portion, the proximal portion of the brim movably coupled to the base, the brim moveable from a first position in which the brim functions as a sun visor, to a second position in which the brim comprises a face mask, the distal portion of the brim comprising a concave section disposed approximately halfway along a width of the brim, such that when the brim is in the second position, the concave section is disposed at least partially about the user's nose, the brim having at least one eye opening disposed therein, the at least one eye opening being located at approximately eye level to the user when the brim is in the second position;
wherein the proximal portion of the brim is moveably coupled to the base by at least one hinge comprising:
i) a male portion coupled to the base;
ii) a female portion coupled to the proximal portion of the brim, the female portion having a body with a spring disposed therein; and
iii) a pin that extends through both the male and female portions;
wherein when the male portion is mated with the female portion, the spring inside the body of the female portion applies force against an outside surface of the male portion, providing resistance against moving the brim from the first position to the second position, and resistance against moving the brim from the second position to the first position.

2. The headwear of claim 1, wherein the headwear comprises a hat.

3. The headwear of claim 1, wherein the at least one eye opening comprises a glasses lens.

4. Headwear comprising:
a) a band portion for securing the headwear to a user's head, the band portion having a front section and a rear section;
b) a base attached to and extending away from the front section of the band portion; and
c) a brim movably coupled to the base, the brim moveable from a first position in which the brim functions as a sun visor, to a second position in which the brim comprises a face mask,
wherein the brim is moveably coupled to the base by at least one hinge comprising:
i) a male portion;
ii) a female portion having a body with a spring disposed therein; and
iii) a pin that extends through both the male and female portions;
wherein when the male portion is mated with the female portion, the spring inside the body of the female portion applies force against an outside surface of the male portion, providing resistance against moving the brim from the first position to the second position, and resistance against moving the brim from the second position to the first position.

5. The headwear of claim 4, wherein the brim remains in either the first or second position until the user applies force to move the brim to the other position.

6. The headwear of claim 4, wherein the brim comprises at least one eye opening disposed therein, the at least one eye opening being located at approximately eye level to the user when the brim is in the second position.

7. The headwear of claim 6, wherein the at least one eye opening comprises a glasses lens.

8. The headwear of claim 4, wherein a distal portion of the brim comprises a concave section disposed approximately halfway along a width of the brim, such that when the brim is in the second position, the concave section is disposed at least partially about the user's nose.

9. The headwear of claim 4, wherein
the male portion of the hinge is coupled to the base and
the female portion of the hinge is coupled to the brim.

10. The headwear of claim 4, wherein
the male portion of the hinge is coupled to the brim and
the female portion of the hinge is coupled to the base.

11. The headwear of claim 4, wherein the headwear is a hat.

12. Headwear comprising:
a) a band portion for securing to a user's head, the band portion having a front section and a rear section; and
b) a brim movably coupled to the front section of the band portion, the brim moveable from a first position in which the brim functions as a sun visor, to a second position in which the brim comprises a face mask
wherein the brim is moveably coupled to the front section of the band portion by at least one hinge comprising:
i) a male portion;
ii) a female portion having a body with a spring disposed therein; and
iii) a pin that extends through both the male and female portions;
wherein when the male portion is mated with the female portion, the spring inside the body of the female portion applies force against an outside surface of the male portion, providing resistance against moving the brim from the first position to the second position, and resistance against moving the brim from the second position to the first position.

13. The headwear of claim 12, wherein the brim comprises at least one eye opening disposed therein, the at least one eye opening being approximately eye level to a user when the brim is in the second position.

14. The headwear of claim 13, wherein the at least one eye opening comprises a glasses lens.

15. The headwear of claim 12, wherein a distal portion of the brim comprises a concave section disposed approximately halfway along a width of the brim, such that when the brim is in the second position, the concave section is disposed at least partially about the user's nose.

16. The headwear of claim 12, wherein the brim remains in either the first or second position until a user applies pressure to move the brim to the other position.

17. The headwear of claim 12, wherein
the male portion is coupled to the front section of the band portion and
the female portion is coupled to the brim.

18. The headwear of claim 12, wherein
the male portion is coupled to the brim and
the female portion is coupled to the front section of the band portion.

19. The headwear of claim 12, wherein the headwear is a hat.

* * * * *